United States Patent
Lee et al.

(10) Patent No.: US 8,077,770 B2
(45) Date of Patent: Dec. 13, 2011

(54) METHODS AND APPARATUS FOR REDUCING MODULATION SIGNAL BANDWIDTH IN POLAR MODULATION TRANSMITTERS

(75) Inventors: Wayne S. Lee, San Mateo, CA (US); Tony L. Wong, Hayward, CA (US)

(73) Assignee: Panasonic Corporation, Osaka (JP)

( * ) Notice: Subject to any disclaimer, the term of this patent is extended or adjusted under 35 U.S.C. 154(b) by 866 days.

(21) Appl. No.: 12/123,772

(22) Filed: May 20, 2008

(65) Prior Publication Data
US 2009/0290631 A1 Nov. 26, 2009

(51) Int. Cl.
*H04B 1/66* (2006.01)

(52) U.S. Cl. ........................................ 375/240; 375/296

(58) Field of Classification Search ................ 375/240, 375/296, 308
See application file for complete search history.

(56) References Cited

U.S. PATENT DOCUMENTS

| | | | |
|---|---|---|---|
| 5,329,547 A * | 7/1994 | Ling | 370/342 |
| 6,801,086 B1 * | 10/2004 | Chandrasekaran | 330/140 |
| 6,834,084 B2 * | 12/2004 | Hietala | 375/296 |
| 7,054,385 B2 | 5/2006 | Booth et al. | |
| 2007/0110184 A1 | 5/2007 | Liang et al. | |

* cited by examiner

Primary Examiner — Khanh C Tran
Assistant Examiner — David Huang

(57) ABSTRACT

Methods and apparatus for reducing the bandwidth of modulation signals in a phase path of a polar modulation transmitter. An exemplary method includes generating a phase difference modulation signal for a phase path of a polar modulation transmitter, and filtering the phase difference modulation signal using a linear-phase filter. Filtering the phase difference modulation signal may be performed by first detecting samples in the phase difference modulation signal that have phase difference values in excess of a phase difference threshold and then filtering samples in the vicinity of the threshold-violating samples to remove the threshold-violating events. Alternatively, all samples may be filtered, i.e., without regard as to whether any given sample exceeds a phase difference threshold, to remove large phase difference changes in the phase difference modulation signal, or a combination of linear-phase and nonlinear filters may be used to remove the large phase difference changes.

20 Claims, 7 Drawing Sheets

400

METHODS AND APPARATUS FOR REDUCING MODULATION SIGNAL BANDWIDTH IN POLAR MODULATION TRANSMITTERS

FIELD OF THE INVENTION

The present invention relates to communications methods and systems. More specifically, the present invention relates to methods and apparatus for reducing modulation signal bandwidth in polar modulation transmitters.

BACKGROUND OF THE INVENTION

In digital communications systems, digital information to be transmitted is used to modulate the amplitude, angle (i.e., phase or frequency) or both of a carrier signal. The resulting modulated carrier signal is then used to carry the digital information across a communication channel to a receiver. Whether the digital information is used to modulate the amplitude, the angle, or both the amplitude and angle of the carrier signal depends on what modulation scheme is employed. In some modulation schemes only the angle of the carrier signal is modulated, so that the resulting modulated carrier signal has a constant-amplitude, i.e., a "constant envelope." Such is the case with Gaussian minimum shift keying (GMSK), which is the modulation scheme used in second generation (2G) Global System for Mobile Communications (GSM) cellular communications systems. In GMSK a continuous-phase frequency-shift keying type of modulation scheme is employed which affects only the frequency of the carrier signal.

To increase spectral efficiency, many state-of-the-art communications systems, including third generation (3G) cellular communications systems such as EDGE (Enhanced Data rates for GSM Evolution) and W-CDMA (Wideband Code Division Multiple Access), employ modulation schemes that produce non-constant-envelope signals. To prevent signal clipping of these types of signals in traditional quadrature-modulator-based transmitters, the levels of the signals are reduced before being introduced to the transmitter's power amplifier (PA), and the PA is configured to operate in its linear region of operation. Unfortunately, this results in a very inefficient use of power and a trade-off between linearity and efficiency.

The linearity versus efficiency tradeoff experienced by conventional quadrature-modulator-based transmitters can be avoided by using a polar modulation transmitter. In a polar modulation transmitter, amplitude and phase modulation are processed in separate amplitude and phase paths. An amplitude modulation (AM) signal representing envelope information is used to generate an amplitude modulated power supply signal in the amplitude path, while a constant-amplitude phase modulation (PM) signal is used to modulate a carrier signal generated by a voltage controlled oscillator (VCO) in the phase path. The phase-modulated carrier signal at the output of the VCO is amplified by the polar modulation transmitter's PA. Because the phase-modulated carrier signal has a constant amplitude, the PA can be configured to operate as a highly-efficient nonlinear PA without the risk of signal clipping. Typically, the PA comprises a switch-mode type of PA (e.g., a Class D, E or F PA) configured to operate in compression, so the amplitude modulation in the amplitude modulated power supply signal is directly modulated onto the phase modulated carrier signal as the phase modulated carrier signal is being amplified. Hence, by processing the AM and PM signals in separate paths, the traditional trade-off between linearity and efficiency is avoided.

In addition to being power efficient, the polar modulation transmitter is adaptable to different modulation schemes using digital signal processing techniques. Digital signal processing allows the same radio architecture to be used for different standards, thereby making the polar modulation transmitter well-suited for multimode operation. By contrast, conventional quadrature-modulator-based transmitters require the use of narrowband surface acoustic wave (SAW) filters to attenuate spurious signals generated by upconverting mixers used to translate the baseband signal to RF. However, because each modulation standard typically operates under a different bandwidth, providing multimode capability becomes expensive and difficult to accomplish in quadrature-modulator-based transmitters.

Although the polar modulation transmitter offers a number of advantages over conventional quadrature-modulator-based transmitters, it does present some challenges. One important challenge relates to the fact that the modulation signals are processed in the polar domain (i.e., in terms of polar coordinates). Modulation signals processed in terms of polar coordinates typically have higher bandwidths compared to modulation signals processed in terms of in-phase and quadrature (i.e., rectangular) coordinates. Depending on the modulation scheme being used, signal trajectories can pass very close to the origin of the complex signal plane. Generally, these low-magnitude events correspond to changes in the phase of the PM signal occurring in a short interval of time. For example, for signal trajectories that pass through the signal plane origin, instantaneous phase changes of + or −180° can occur.

Unfortunately, the polar modulation transmitter's VCO is unable to respond to large phase changes that occur in short intervals of time. VCOs are comprised of capacitors and inductors, which are by their very nature unable to respond to rapid phase changes. They are also phase-accurate only over a narrow bandwidth. Accordingly, when subjected to PM signals having rapid phase changes, the VCO is unable to produce a phase-accurate output. Phase inaccuracies are highly undesirable since they result in data transmission errors and increase the error vector magnitude (EVM) at the receiving end of the system, thereby making it extremely difficult to comply with communications standards specifications.

It would be desirable, therefore, to have methods and apparatus for reducing or removing rapid phase changes in the phase path of a polar modulation transmitter while, at the same time, maintaining the ability of the polar modulation transmitter's VCO to provide a phase-accurate output.

SUMMARY OF THE INVENTION

Methods and apparatus for reducing the bandwidth of modulation signals in a phase path of a polar modulation transmitter are disclosed. An exemplary method includes generating a phase difference modulation signal for a phase path of a polar modulation transmitter, and filtering the phase difference modulation signal using a linear-phase filter. Filtering the phase difference modulation signal is performed by first detecting samples in the phase difference modulation signal that have phase difference values in excess of a phase difference threshold and then filtering samples in the vicinity of the threshold-violating samples to remove the threshold-violating events. Alternatively, all samples are filtered, i.e., without regard as to whether any given sample exceeds a phase difference threshold, to remove large phase difference changes in the phase difference modulation signal, or a combination of linear-phase and nonlinear filters are used to remove the large phase difference changes.

Further features and advantages of the present invention, including a description of the structure and operation of the above-summarized and other exemplary embodiments of the invention, are described in detail below with respect to accompanying drawings, in which like reference numbers are used to indicate identical or functionally similar elements.

DETAILED DESCRIPTION

Figure 1:
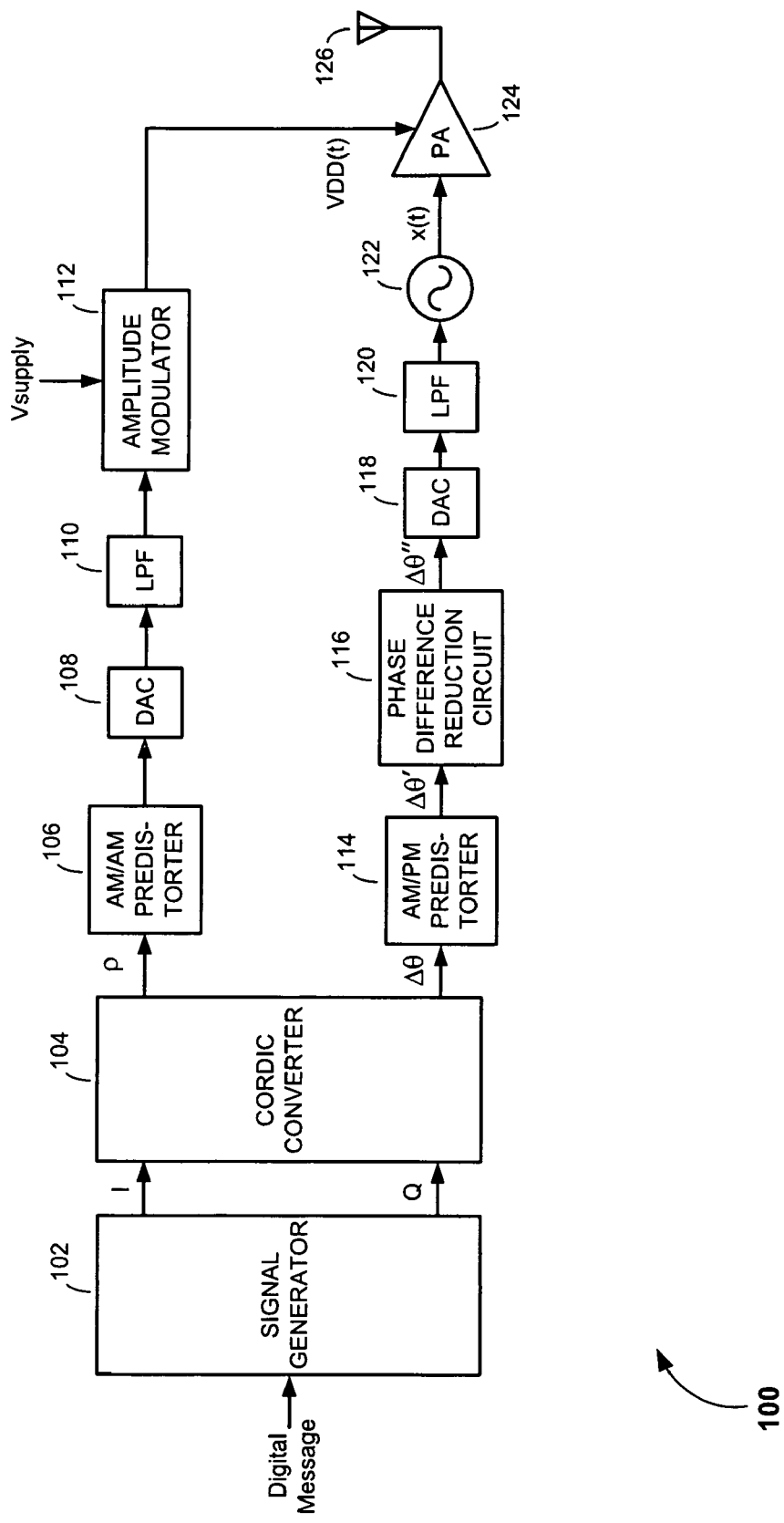
FIG. 1 is a drawing of a polar modulation transmitter, according to an embodiment of the present invention.

Referring to FIG. 1 there is shown a drawing of a polar modulation transmitter 100, according to an embodiment of the present invention. The polar modulation transmitter 100 includes a signal generator 102; a rectangular-to-polar converter (such as a Coordinate Rotation Digital Computer (CORDIC) converter) 104; an amplitude path including an amplitude modulation to amplitude modulation (AM/AM) predistorter 106, an amplitude-path digital-to-analog converter (DAC) 108, an amplitude-path analog low-pass filter (LPF) 110 and an amplitude modulator 112; a phase path including an amplitude modulation to phase modulation (AM/PM) predistorter 114, a phase difference reduction circuit 116, a phase-path DAC 118, a phase-path analog LPF 120 and a voltage controlled oscillator (VCO) 122; a PA 124; and an antenna 126.

The signal generator 102 operates to generate in-phase (I) and quadrature phase (Q) data streams from a digital message to be transmitted. The CORDIC converter 104 operates to convert the I and Q data streams into digital polar-coordinate amplitude and angle modulation signals $\rho$ and $\Delta\theta$. According to one embodiment, the digital polar-coordinate amplitude and angle modulation signals $\rho$ and $\Delta\theta$ each comprises a sequence of sets of data samples or oversamples (both referred to simply as "samples" in the description that follows). Each set of samples in the amplitude modulation signal $\rho$ represents the amplitude of a particular symbol to be transmitted, and each corresponding set of samples in the angle modulation signal $\Delta\theta$ represents the angle of the symbol. Note that the angle modulation signal $\Delta\theta$ represents the derivative with respect to time of the instantaneous phase $\theta(t)$ of the signal modulation, i.e., $d\theta(t)/dt$. For this reason, it is referred to as the "phase difference modulation signal" or, alternatively, as the "$\Delta\theta$ modulation signal" in the description that follows.

The AM/AM and AM/PM predistorters 106 and 114 operate to predistort the amplitude and phase difference modulation signals $\rho$ and $\Delta\theta$ in the amplitude and phase paths, respectively, to correct for AM/AM and AM/PM distortions caused by the PA 124. The resulting predistorted amplitude modulation signal, is converted to an analog signal by the amplitude-path DAC 108 and then filtered by the amplitude-path analog LPF 110, to produce an analog amplitude modulation signal. The analog amplitude modulation signal is fed to the amplitude modulator 112, which operates to modulate a direct current power supply voltage, $V_{supply}$. The resulting amplitude modulated power supply signal, VDD(t), is supplied to the power setting input of the PA 124.

As the amplitude modulated power supply signal VDD(t) is generated in the amplitude path, a phase modulated radio frequency (RF) carrier signal is generated in the phase path. Specifically, the predistorted phase difference modulation signal $\Delta\theta'$ appearing at the output of the AM/PM predistorter 114 is fed to the input of the phase difference reduction circuit 116, which as explained in more detail below operates to generate a phase-difference-adjusted phase difference modulation signal $\Delta\theta''$. The phase-path DAC 118 converts the phase-difference-adjusted phase difference modulation signal $\Delta\theta''$ to an analog constant-amplitude phase-difference-adjusted phase difference modulation signal, which is then filtered by the phase-path analog LPF 120 and coupled to the control input of the VCO 122. The VCO 122 operates to produce a constant-amplitude phase-difference-adjusted phase modulated radio frequency (RF) carrier signal x(t), which is coupled to the RF input of the PA 124. The PA 124 comprises a switch-mode PA configured to operate in compression. Accordingly, as the PA 124 amplifies the constant-amplitude phase-difference-adjusted phase modulated RF carrier signal x(t), the amplitude modulation contained in the amplitude modulated power supply signal VDD(t) is modulate onto the signal. Finally, the resulting phase-difference-adjusted amplitude and phase modulated RF carrier signal is fed to the antenna 126, which is operable to radiate the modulated carrier signal to a remote receiver.

Figure 2:
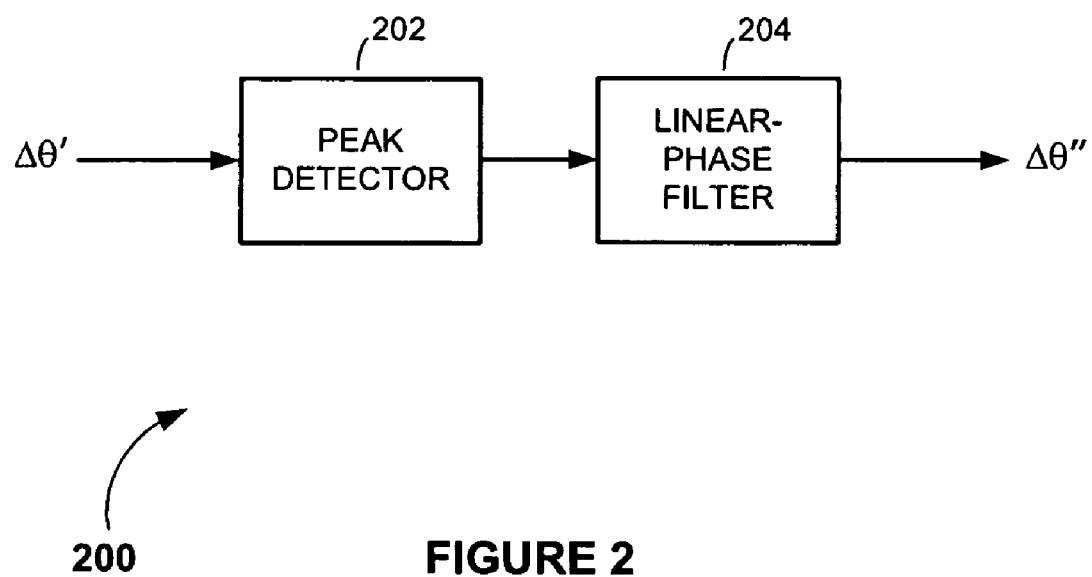
FIG. 2 is a block diagram of an exemplary phase difference reduction circuit which may be used to implement the phase difference reduction circuit in the polar modulation transmitter in FIG. 1.

FIG. 2 is a block diagram of an exemplary phase difference reduction circuit 200 that may be used to implement the phase difference reduction circuit 116 in the polar modulation transmitter 100 in FIG. 1. The phase difference reduction circuit 200 includes a peak detector 202 and a digital linear-phase filter 204. The peak detector 202 is operable to monitor and detect large phase difference changes in the predistorted phase difference modulation signal $\Delta\theta'$. When the peak detector 202 detects a sample-to-sample phase difference (or a symbol-to-symbol phase difference) in the predistorted phase difference modulation signal $\Delta\theta'$ that is greater than an upper phase difference threshold, or detects a sample-to-sample phase difference (or a symbol-to-symbol phase difference) phase difference that is less than a lower phase difference threshold, the linear-phase filter 204 operates to reconstruct samples in the temporal vicinity of the threshold-violating event so that the threshold-violating event is removed from the phase difference modulation. Removing the threshold-violating events relaxes the bandwidth requirements of the polar modulation transmitter's VCO 122.

The upper and lower phase difference thresholds imposed by the linear-phase filter 204 have units of radians/sec, and may be fixed according to satisfy a particular design criterion, such as related to the bandwidth handling capability of the VCO 122. In an alternative embodiment, the upper and lower phase difference thresholds are programmable, thereby allowing VCOs having different bandwidth handling capabilities to be accommodated in the design. Programmable thresholds also provide flexibility in complying with different standards specifications, such as may be necessary when the polar modulation transmitter 100 is configured for multimode operation, for example.

Figure 3A:
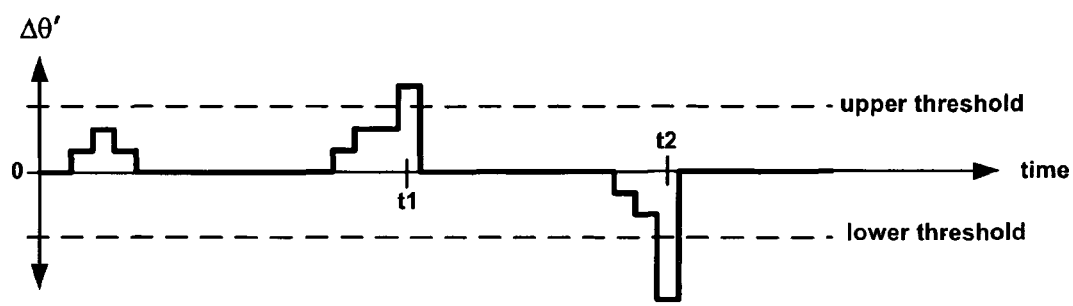
FIGS. 3A-B are time graphs illustrating how a phase difference modulation signal is reconstructed by the phase difference reduction circuit in FIG. 2 so that the resulting phase-difference-adjusted phase difference modulation signal has phase difference values that do not exceed upper and lower phase difference thresholds.
Figure 3B:
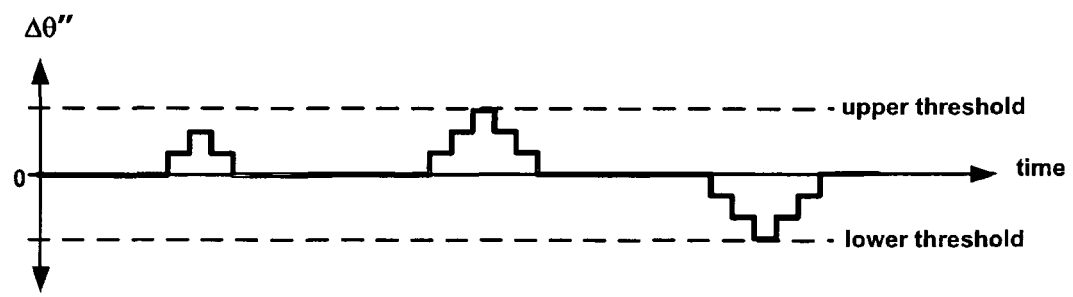

FIGS. 3A and 3B are time graphs illustrating how phase difference samples in the phase difference modulation signal $\Delta\theta'$ applied to the input of the phase difference reduction circuit 200 are reconstructed so that the resulting phase-difference-adjusted phase difference modulation signal $\Delta\theta''$ has phase difference values that do not exceed the upper and lower phase difference thresholds. In addition to all samples having phase difference values falling within the upper and lower thresholds, it can be seen that large sample-to-sample phase difference changes representative of high-frequency content have been removed. Specifically, the large phase difference changes surrounding each of the samples at times t1 and t2 in the phase difference modulation signal $\Delta\theta'$ in FIG. 3A are removed by the filtering and do not appear in the phase-difference-adjusted phase difference modulation signal $\Delta\theta''$ in FIG. 3B. Phase accuracy is also maintained, as the area under the pre-filtered modulation signal $\Delta\theta'$ is seen to be preserved under the post-filtered modulation signal $\Delta\theta''$.

Figure 4:
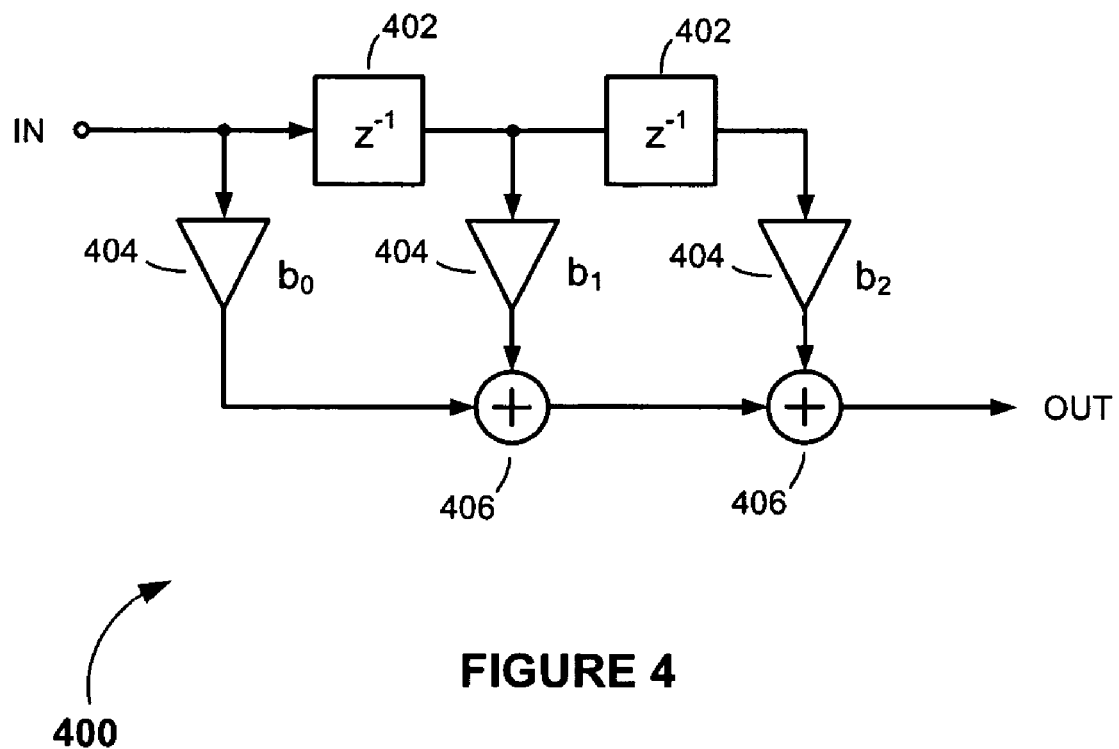
FIG. 4 is a drawing of a second-order linear-phase finite impulse response (FIR) filter which may be used to implement the linear-phase filter of the phase difference reduction circuit in FIG. 2.

The digital linear-phase filter 204 of the phase difference reduction circuit 200 in FIG. 2 may be implemented in a variety of ways. According to one embodiment, it is implemented as a second-order finite input response (FIR) 400, as shown in FIG. 4. The FIR filter 400 comprises a plurality of delay ($z^{-1}$) elements (e.g., registers), a plurality of multipliers 404, and a plurality of summers 406. When configured in the phase path of the polar modulation transmitter 100, samples of the phase difference modulation signal $\Delta\theta'$ are clocked through the delay elements 402. The outputs of the plurality of delay elements 402 are coupled to inputs of the plurality of multipliers 404, which multiply the delayed samples by the filter coefficients $b_o$, $b_1$ and $b_2$. The products at the outputs of the multipliers 404 are summed by the summers 406, thereby providing a filtered (or "phase-difference-adjusted") phase difference modulation signal $\Delta\theta''$ representing the linear convolution of the filter coefficients $b_o$, $b_1$ and $b_2$ with the input phase difference modulation signal $\Delta\theta'$.

The filter coefficients $b_o$, $b_1$ and $b_2$ of the FIR filter 400 are assigned values that define the upper and lower phase difference thresholds. The filter coefficients $b_o$, $b_1$ and $b_2$ may be fixed to satisfy the bandwidth handling capability of a particular VCO. Alternatively, they may be made to be programmable. As previously discussed, the ability to program the upper and lower phase difference thresholds affords the ability to accommodate different VCOs having different bandwidth handling capabilities into the design. It also provides flexibility in satisfying standards specifications such as, for example, adjacent channel leakage ratio and error vector magnitude specifications. While a second-order FIR filter 400 is shown and describe in FIG. 4, those of ordinary skill in the art will readily appreciate and understand that other higher-order FIR filters may alternatively be used.

Use of a linear-phase FIR filter 400 in the phase difference reduction circuit 200 provides a number of advantages. First, since the FIR filter 400 can be configured to produce a linear phase response, phase accuracy can be maintained in the phase path of the polar modulation transmitter 100. Second, the FIR filter 400 is easy to design using commonly available filter design programs. Third, FIR filters can be implemented with a significantly reduced number of logic gates compared to other types of filters, such as nonlinear phase filters, for example. Finally, in addition to being effective at removing large sample-to-sample (or symbol-to-symbol) phase difference changes, the FIR filter 400 is effective at removing other high-frequency content from the phase difference modulation, which the phase-path analog LPF 120 would otherwise be required to filter out. In other words, use of the FIR filter 400 relaxes the design requirements of the phase-path analog LPF 120, allowing it to have a lower-order design than would be needed in the absence of the FIR filter 400. Whereas the FIR filter 400 provides these and other advantages, it should be understood other types of linear-phase filters, besides FIR filters, may alternatively be used to implement the linear-phase filter 204 of the phase difference reduction circuit 200.

Figure 5:
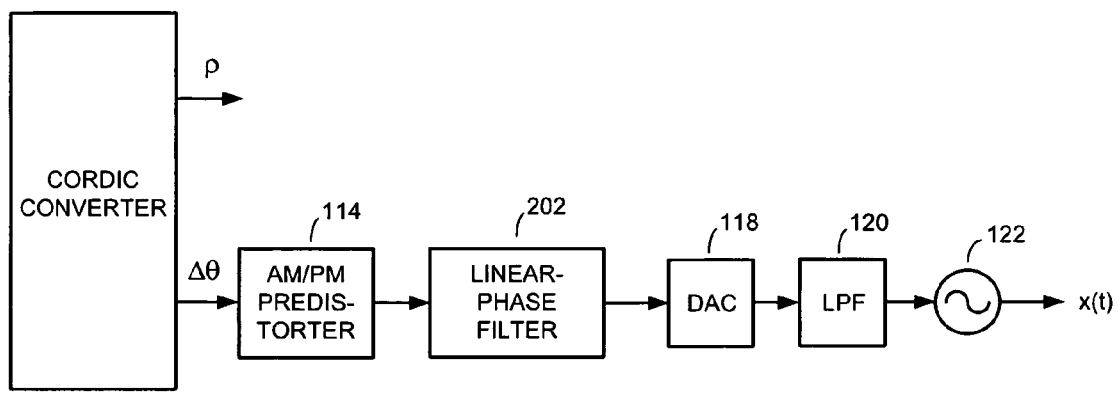
FIG. 5 is a drawing of an alternative phase difference reduction circuit which may be used to implement the phase difference reduction circuit of the polar modulation transmitter in FIG. 1.

The above-described methods and apparatus for reducing the bandwidth of the phase difference modulation in the phase path of the polar modulation transmitter 100 include detecting sample-to-sample (or symbol-to-symbol) phase differences exceeding upper or lower phase difference thresholds and then filtering a limited, predetermined number of samples that occur in the temporal vicinity of the threshold-violating samples. In an alternative embodiment, illustrated in FIG. 5, the phase difference reduction circuit 200 includes only the linear-phase filter 204 and does not include a peak detector 202. According to this embodiment of the invention, all samples of the phase difference modulation signal $\Delta\theta'$ are filtered by the linear-phase filter 204, rather than just a predetermined number of samples occurring in the vicinity of the threshold-violating samples.

Figure 6:
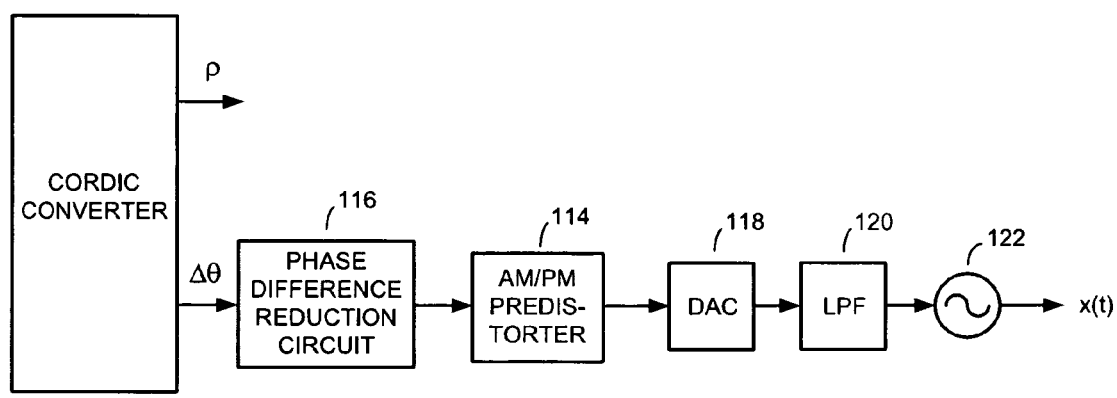
FIG. 6 is a drawing illustrating how the phase difference reduction circuit in the polar modulation transmitter in FIG. 1 can alternatively be disposed before the amplitude modulation to phase modulation (AM/PM) predistorter in the phase path of the polar modulation transmitter.

In FIG. 1, the phase difference reduction circuit 116 is shown to be disposed after the AM/PM predistorter 114 in the phase path of the polar modulation transmitter 100. In an alternative embodiment, shown in FIG. 6, the phase difference reduction circuit 116 is disposed before the AM/PM predistorter 114. According to this embodiment, the phase difference modulation signal AO at the output of the CORDIC converter 104 is operated on by the phase difference reduction circuit 116 prior to being predistorted by the AM/PM predistorter 114. By positioning the phase difference reduction circuit 116 before the AM/PM predistorter 114, the PA correction process performed by the AM/PM predistorter 114 can be preserved and not altered by the phase difference reduction circuit 116.

Figure 7:
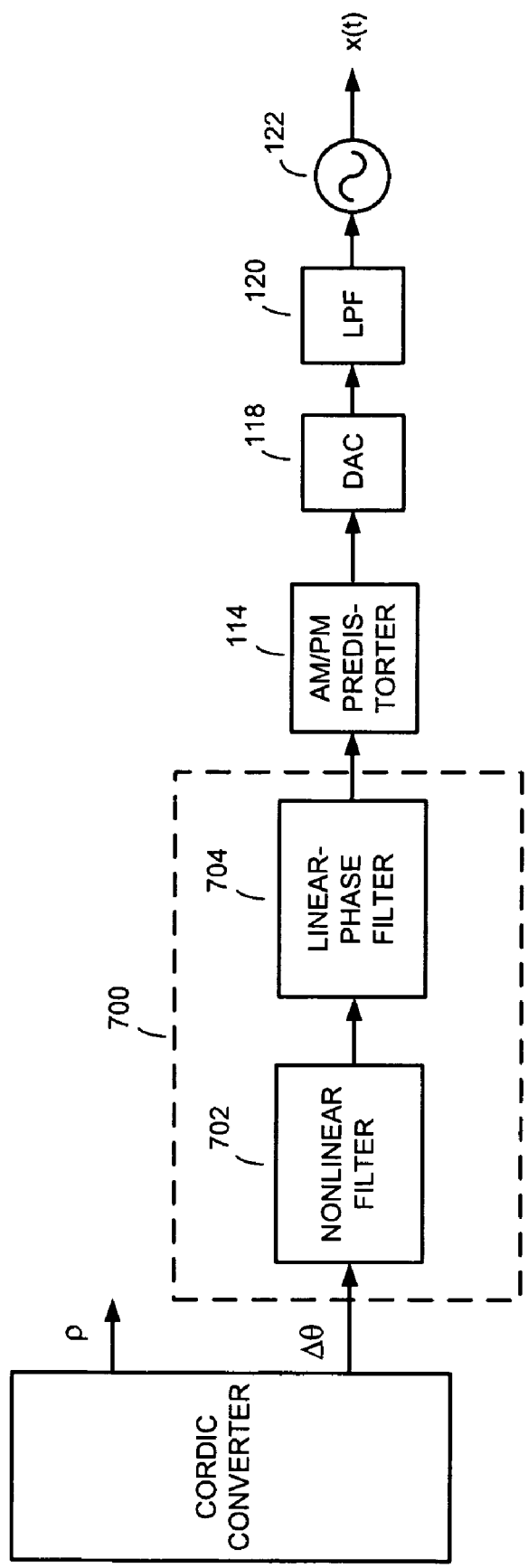
FIG. 7 is a drawing illustrating how the phase path of the polar modulation transmitter in FIG. 1 may be adapted to include a cascade of linear-phase and nonlinear filters, according to an embodiment of the present invention.

Finally, while the methods and apparatus for reducing the bandwidth of the phase difference modulation in the phase path of the polar modulation transmitter 100 have been described as including a phase difference reduction circuit 200 with a single linear-phase filter 204, in an alternative embodiment shown in FIG. 7, a phase difference reduction circuit 700 includes one or more nonlinear and linear-phase filters 702 and 704 operable to reduce the phase difference modulation bandwidth in the phase path of the polar modulation transmitter 100. The linear-phase filter 704 may be implemented using a FIR filter, similar to the one described above. Some exemplary nonlinear filtering techniques that may be used to implement the nonlinear filter 702 are described in U.S. Pat. No. 7,054,385 and co-pending U.S. patent application Ser. No. 11/274,068, both of which are hereby incorporated by reference.

While the phase difference reduction circuit 700 in FIG. 7 is shown as including the nonlinear filter 702 before the linear-phase filter 704, and shows the nonlinear and linear-phase filters 702 and 704 cascaded directly one after the other, neither the ordering nor the direct cascading of the filters 702 and 704 is mandatory. In other words, the nonlinear filter 702 may be configured before or after the linear-phase filter 704, and either or both the nonlinear filter 702 and linear-phase filter 704 may be configured prior to or after the AM/PM predistorter 114. One advantage of positioning the filters 702 and 704 before the AM/PM predistorter 114 is that the PA correction process performed by the AM/PM predistorter 114 can be preserved and not altered by the filters 702 and 704.

Although the present invention has been described with reference to specific embodiments thereof, these embodiments are merely illustrative, and not restrictive, of the present invention. For example, whereas the various exemplary embodiments have been described in terms of hardware (i.e., circuits), those of ordinary skill in the art will appreciate and understand that the functions performed by the various circuits, including, for example, the polar signal generating, filtering and predistorting functions, can alternatively be performed using software techniques, or a combination of hardware and software techniques. For these reasons, the scope of invention should not be limited to the specifically disclosed exemplary embodiments, but should be limited only by what is set forth in the appended claims.

What is claimed is:

1. A method of reducing the bandwidth of modulation signals in the phase path of a polar modulation transmitter, comprising:
    generating a phase difference modulation signal for a phase path of a polar modulation transmitter; and
    filtering said phase difference modulation signal using a linear-phase filter to produce a phase-difference-adjusted phase difference modulation signal, wherein filtering said phase difference modulation signal comprises:
        detecting phase difference values in said phase difference modulation signal that exceed a phase difference threshold; and
        filtering the phase difference modulation signal so that detected phase difference values exceeding said phase difference threshold are reduced below said threshold.

2. The method of claim 1 wherein said phase difference threshold is programmable.

3. The method of claim 1, further comprising predistorting said phase-difference-adjusted phase difference modulation signal.

4. The method of claim 1 wherein generating said phase difference modulation signal further comprises predistorting the phase difference modulation signal to produce a predistorted phase difference modulation signal, and filtering said phase difference modulation signal using said linear-phase filter comprises filtering said predistorted phase difference modulation signal rather than filtering said phase difference modulation signal.

5. The method of claim 1 wherein said linear-phase filter comprises a linear-phase finite impulse response (FIR) filter.

6. The method of claim 1, further comprising filtering said phase-difference-adjusted phase difference modulation signal using a nonlinear filter.

7. The method of claim 1 wherein generating said phase difference modulation signal includes filtering the phase difference modulation signal using a nonlinear filter to produce a nonlinear-filtered phase difference modulation signal, and filtering said phase difference modulation signal comprises filtering said nonlinear-filtered phase difference modulation signal rather than filtering said phase difference modulation signal.

8. A polar modulation transmitter comprising:
    a phase path configured to receive a phase difference modulation signal; and
    a phase difference reduction circuit comprises a linear-phase filter configured to generate a phase-difference-adjusted phase difference modulation signal from said phase difference modulation signal, and a peak detector operable to detect occurrences in said phase difference modulation signal having phase difference values that exceed a phase difference threshold, wherein filtering is performed on the phase difference modulation signals that exceed the phase difference threshold.

9. The polar modulation transmitter of claim 8 wherein said phase difference modulation signal comprises a predistorted phase difference modulation signal.

10. The polar modulation transmitter of claim 8, further comprising an amplitude modulation to phase modulation predistorter configured to receive said phase-difference-adjusted phase difference modulation signal and produce a predistorted phase-difference-adjusted phase difference modulation signal.

11. The polar modulation transmitter of claim 8 wherein said phase difference threshold is programmable.

12. The polar modulation transmitter of claim 8 wherein said phase difference reduction circuit further comprises nonlinear filter configured to receive said phase difference modulation signal to generate a nonlinear-filtered phase difference modulation signal, and said linear-phase filter is configured to filter said nonlinear-filtered phase difference modulation signal rather than filtering said phase difference modulation signal.

13. The polar modulation transmitter of claim 8 wherein said phase difference reduction circuit further comprises a nonlinear filter configured to filter said phase-difference-adjusted phase difference modulation signal.

14. The polar modulation transmitter of claim 8 wherein said linear-phase filter comprises a linear-phase finite impulse response (FIR) filter.

15. An apparatus for reducing the bandwidth of modulation signals in a phase path of a polar modulation transmitter, comprising:
    means for generating a phase difference modulation signal; and
    means for filtering said phase difference modulation signal to produce a phase-difference-adjusted phase difference modulation signal that is linearly related to said phase difference modulation signal, wherein said means for filtering said phase difference modulation signal includes means for detecting occurrences in said phase difference modulation signal having phase difference values that exceed a phase difference threshold and filtering is performed on the phase difference modulation signals that exceed the phase difference threshold.

16. The apparatus of claim 15, further comprising means for predistorting said phase-difference-adjusted phase difference modulation signal.

17. The apparatus of claim 15, further comprising means for predistorting said phase difference modulation signal to produce a predistorted phase difference modulation signal, and said means for filtering is configured to filter said predistorted phase difference modulation signal rather than said phase difference modulation signal.

18. The apparatus of claim 15 wherein said phase difference threshold is programmable.

19. The apparatus of claim 15, further comprising means for nonlinear filtering said phase difference modulation signal to produce a nonlinear-filtered phase difference modulation signal, and said means for filtering is configured to filter said nonlinear-filtered phase difference modulation signal rather than said phase difference modulation signal.

20. The apparatus of claim 15, further comprising means for nonlinear filtering said phase-difference-adjusted phase difference modulation signal.

* * * * *